United States Patent
Van Den Abeele et al.

(10) Patent No.: US 10,313,198 B2
(45) Date of Patent: Jun. 4, 2019

(54) CRASH RECOVERY FOR SMART OBJECTS

(71) Applicants: KONINKLIJKE KPN N.V., Rotterdam (NL); IMEC VZW, Leuven (BE); UNIVERSITEIT GENT, Ghent (BE)

(72) Inventors: Floris Van Den Abeele, Sint-Martens-Latem (BE); Jeroen Hoebeke, De Pinte (BE)

(73) Assignees: KONINKLIJKE KPN N.V., Rotterdam (NL); IMEC VZW, Leuven (BE); UNIVERSITEIT GENT, Ghent (BE)

( * ) Notice: Subject to any disclaimer, the term of this patent is extended or adjusted under 35 U.S.C. 154(b) by 64 days.

(21) Appl. No.: 15/113,315

(22) PCT Filed: Jan. 22, 2015

(86) PCT No.: PCT/EP2015/051188
§ 371 (c)(1),
(2) Date: Jul. 21, 2016

(87) PCT Pub. No.: WO2015/110494
PCT Pub. Date: Jul. 30, 2015

(65) Prior Publication Data
US 2017/0005875 A1  Jan. 5, 2017

(30) Foreign Application Priority Data
Jan. 23, 2014 (EP) ................... 14152299

(51) Int. Cl.
*H04L 12/24* (2006.01)
*H04L 29/08* (2006.01)
(Continued)

(52) U.S. Cl.
CPC ............ *H04L 41/12* (2013.01); *H04L 41/085* (2013.01); *H04L 41/0816* (2013.01);
(Continued)

(58) Field of Classification Search
CPC ........ H04L 41/12; H04L 67/42; H04L 67/00; H04L 69/40; H04L 41/085; H04L 41/0816; H04L 67/02; H04L 67/10
See application file for complete search history.

(56) References Cited

U.S. PATENT DOCUMENTS

| 8,332,688 | B1 | 12/2012 | Tompkins |
| 2002/0083172 | A1 | 6/2002 | Knowles et al. |

(Continued)

FOREIGN PATENT DOCUMENTS

| EP | 1187015 A2 | 3/2002 |
| EP | 1324535 A2 | 7/2003 |
| EP | 1542137 A1 | 6/2005 |

OTHER PUBLICATIONS

Shelby, et al., "Constrained Application Protocol (CoAP)," draft-ietf-fore-foap-18.txt, internet engineering task force, IETF; Standard Working Draft, Internet Society (ISOC) pp. 1-118 (2013).

(Continued)

*Primary Examiner* — Oanh Duong
(74) *Attorney, Agent, or Firm* — Hamilton, Brook, Smith & Reynolds, P.C.

(57) ABSTRACT

A method for enabling restoration of an operational state on a server node is disclosed. The method includes intercepting, by a state directory, traffic between the server node and a client communicably connected to the server node over a network to derive the operational state. At least a part of the traffic between the server node and the client leads to establishment of the operational state on the server node. The method further includes storing the operational state in the state directory, detecting, by the state directory, that the server node has lost the operational state, and providing, by the state directory, the operational state to the server node after detecting that the server node has lost the operational state.

14 Claims, 9 Drawing Sheets

(51) Int. Cl.
H04L 29/14 (2006.01)
H04L 29/06 (2006.01)
(52) U.S. Cl.
CPC .............. *H04L 67/00* (2013.01); *H04L 67/42* (2013.01); *H04L 69/40* (2013.01); *H04L 67/02* (2013.01); *H04L 67/10* (2013.01)

(56) References Cited

U.S. PATENT DOCUMENTS

| | | | | |
|---|---|---|---|---|
| 2002/0091456 | A1* | 7/2002 | O'Connor | G06Q 10/087 700/97 |
| 2003/0237008 | A1* | 12/2003 | Freevol | G06F 1/30 713/300 |
| 2009/0031381 | A1 | 1/2009 | Cohen et al. | |
| 2009/0222812 | A1* | 9/2009 | Nissen | G06F 17/30067 717/173 |
| 2010/0037323 | A1* | 2/2010 | Lemieux | G06F 21/57 726/26 |
| 2010/0304721 | A1 | 12/2010 | Krco | |
| 2011/0124406 | A1* | 5/2011 | Blackburn | G07F 17/323 463/25 |
| 2012/0054540 | A1* | 3/2012 | Howard | G06F 9/4401 714/6.12 |
| 2012/0215366 | A1 | 8/2012 | Redmond et al. | |
| 2013/0304604 | A1 | 11/2013 | Hoffman et al. | |
| 2013/0305101 | A1* | 11/2013 | Gupta | G06F 21/56 714/47.3 |
| 2014/0181992 | A1 | 6/2014 | Janson et al. | |
| 2015/0305008 | A1* | 10/2015 | Kim | H04W 72/0406 370/329 |
| 2015/0358824 | A1* | 12/2015 | Kim | H04W 4/005 726/4 |
| 2015/0365467 | A1 | 12/2015 | Hoebeke et al. | |

OTHER PUBLICATIONS

Nanxing, C., et al., "Passive Interoperability Testing for Request-Response Protocols: Method, Tool and Application on CoAP Protocol," Testing Software and Systems, pp. 87-102 (2012).
Notification of Transmittal of International Search Report and the Written Opinion of the International Searching Authority, or the Declaration, for PCT/EP2015/051188, entitled: "Crash Recovery for Smart Objects," dated Apr. 15, 2015.
European Search Report for EP Application No. 14152299.5, entitled: "Crash Recovery for Smart Objects," dated Apr. 15, 2014.

* cited by examiner

CRASH RECOVERY FOR SMART OBJECTS

This application is the U.S. National Stage of International Application No. PCT/EP2015/051188, filed Jan. 22, 2015, which designates the U.S., published in English, and claims priority under 35 U.S.C. §§ 119 or 365(c) to European Patent Application No. 14152299.5, filed Jan. 23, 2014. The entire teachings of the above applications are incorporated herein by reference.

FIELD OF INVENTION

The disclosure generally relates to the field of constrained nodes or devices accessible over a network. In particular, though not necessarily, the disclosure relates to methods, a state directory, systems, and a computer program product for enabling restoration of an operational state on a server node in a constrained network.

BACKGROUND

Various devices, deployed as a network of nodes, have become useful for collecting and/or process data in applications such as ambient intelligence, smart environments, and autonomous control. For example, networked sensors may be deployed in a building to measure the temperature and humidity such that an air conditioning system for the building may be adjusted autonomously. These networked devices are generally referred to as constrained nodes or constrained devices in a (constrained) network, where the term "constrained" is used to express presence of limitations in terms of, e.g., power and/or computing resources. With the advent of technologies such as 6lowpan, these nodes have become easily accessible over the Internet, where each node is uniquely identifiable and where the nodes act as servers to which clients can connect (therefore, in the following, such nodes are referred to as "servers" or "server nodes"). Such a system of server nodes is sometimes referred to colloquially as "Internet of Things". The server nodes may be in a wired network and/or a wireless network. The networks that connect these server nodes may be low power and lossy networks (LLNs).

A client may be configured to access a server node through a server-client relationship, using a protocol such as e.g. Constrained Application Protocol (CoAP). Typically, each of the server nodes has at least one REST resource, where, as used herein, the term "REST resource" refers to a source of specific information which can be referenced with a global identifier. Examples of the kind of specific information of the resource include temperature, humidity, room location, picture, or light control. An example of a global identifier is a uniform resource identifier (URI) in HTTP. Examples of identifiers of such REST resources include "http://example.org/temperature", "/humidity", "/room_location", "/picture", and "/light_control". When a client accesses a server node, it may e.g. query the server node for the resource at the node. For example, using the (conditional) observe option of the CoAP protocol it is possible for a client to observe a resource on a sensor (e.g. sensor values) and to receive notifications of interest.

In order to properly operate, a server node needs to have access to operational state information, i.e. all state information that defines the behaviour of the server node in an operational network over time. For example, when a client establishes a relationship with a server node and the existence of this relationship results in notifications of interest being sent from the server node to the client, the operational state will determine how and which data will be sent to the client. Another example includes a situation where resources are offered in order to change protocol settings and/or parameters of the application on the server node (e.g. sensor sampling rate, sleep behavior). In such a situation, a client may interact with a server node, using CoAP, and update protocol settings via a CoAP resource. The operational state in this case determines the behavior of software/protocols running on the server node.

Since the server node needs to have operational state information available to it, this information could e.g. be stored at the server node's memory. The most relevant kinds of memory are the on-chip memory of a microcontroller (RAM), Electrically Erasable Programmable Read-Only Memory (EEPROM), and Flash storage. EEPROM is electronic non-volatile computer storage that can be electrically erased and reprogrammed. EEPROM erasing and reprogramming is expensive in terms of memory and power consumption, is read-only and cumbersome to reprogram at run-time and is, therefore, typically used as program memory. RAM memory is mostly volatile memory that can be read/written at run-time. It is the RAM memory that is typically used for storing operational state information. As a result, some server nodes, such as e.g. low-cost sensor nodes, cannot adequately provide persistent memory at run time for storing operational state information. Even if a server node can store all operational states in its volatile memory, when the node crashes, reboots or its batteries are replaced, this information is lost and needs to be restored.

The process of restoration of the lost operational state on a server node may be referred to as "crash recovery." Typically the parties that are able to store operational state information and perform the crash recovery to restore the lost state information are third party hosts that engage with the server nodes. One problem is then, as these hosts are often outside of the local network of the server node or even not online (e.g. third party establishment of binding between sensor and actuator), the crash detection and restore times are often unacceptably high. Another problem is that the server node needs to have additional code or intelligence that would enable the server to exchange the operational state information with a third party, which is often not feasible on a constrained device or introduces additional complexity. Yet another problem is that this approach causes additional traffic for storing operational state information, which is highly undesirable in the already limited constrained network.

One way to solve these problems could be adding to the server nodes additional persistent hardware components (e.g. Flash storage, TI's FRAM) capable of storing larger amounts of operational states in a persistent manner. However, this increases the manufacturing cost. Alternatively, operational states could be stored in a persistent way by reprogramming on the fly the EEPROM of the server node. This is typically done for over-the-air updates, but is less suited for storing operational state as it would require reprogramming the EEPROM at run-time for every change to the operational state.

What is needed in the art is a crash recovery mechanism that overcomes one or more drawbacks described above. In particular, a more lightweight mechanism is needed that does not require any modifications to the existing hardware of constrained server nodes.

SUMMARY

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

To reduce or eliminate at least some of the problems discussed above, according to one aspect of an embodiment of the present invention, a computer-implemented method, performable by a state directory, for enabling restoration of an operational state on a server node is provided. The method comprises intercepting traffic between the server and a client to derive the operational state, where the client is communicably connected to the server node over a network and where at least a part of the traffic between the server node and the client leads to establishment of the operational state on the server node. The method further comprises storing the derived operational state in the state directory, detecting that the server node has lost the operational state, and providing the operational state to the server node after detecting that the server node has lost the operational state. Once the operational state is provided to the server node, the server node is able to restore the lost operational state.

The server node may be associated with a node identifier, e.g., to uniquely address the node, and the server node configured with at least one resource. Generally, a server node may include a device such as a sensor, an actuator, etc. Typically, the server node may include a constrained device. A resource of a server node may have information associated with that node and/or has a state associated with that node. A server node having different measuring sensors such as a temperature sensor and a humidity sensor may be considered a node with resources including "/temperature" and "/humidity". A battery-powered server node may be considered a node with a resource "/battery_level" or any suitable resource for revealing the node's battery level. A server node located at a particular room in a building may be considered a node with a resource "/room_number" or any suitable resource which reveals information associated with the node. In some cases, a resource is associated with an action that can be executed on the server node (e.g., such as turning on a light, or adjusting a setting of an air conditioner). A server node capable of switching on or off the light may be considered as a node with a resource "/light_control". A server node may be configured with certain capabilities, which may enable a node to respond to certain types of client requests and/or perform certain actions.

As used herein, the term "operational state" is used to describe all state information that defines the behavior of the server node in an operational network, possibly over time. The term "behavior" of the server node is used to describe the activity of the node in the network such as e.g. how (e.g. REST, routing, etc.) and which traffic will be generated in the network by the server node, sleeping and non-sleeping behavior, and duty cycling behavior.

The method described above may further comprise steps for removing the operational state from the state directory. Three different embodiments are disclosed for doing so.

According to the first embodiment, the method may further comprise the state directory intercepting further traffic between the server node and the client to determine that the operational state is to be removed from the state directory and, after such a determination, removing the operational state from the state directory. This embodiment advantageously allows the state directory to maintain consistency between the operational state stored therein and the operational state on server nodes and avoid unnecessarily increasing traffic on the network.

According to the second embodiment, it could be that it's not "further traffic" but, rather, the lack of further traffic between the server node and the client that indicates to the state directory that the operational state should be removed. In such an embodiment, the method may further comprise the state directory determining that the operational state is to be removed from the memory of the state directory as a result of the lack of further traffic between the server node and the client and, after such determination, removing the operational state from the state directory. This embodiment is particularly beneficial in situations where additional signaling may be needed from the client, the server node, or both in order to keep the relationship alive or to verify its existence.

In the third embodiment, the state directory may be communicably connected to a further node over the network and the method may then further comprise the state directory receiving from the further node a request to remove the operational state from the state directory, and removing the operational state from the state directory after receiving such request. This embodiment provides the advantage that a third party, i.e. a party other than the client, the server and the state directory, may have the flexibility to configure which state should be maintained in the state directory.

In an embodiment, the state directory may detect that the server node has lost the operational state as a result of receiving from the server node a message indicating that the server node has lost the operational state. This embodiment covers the scenario of "active detection" where the server node actively contacts the state directory and indicates to the state directory that it has lost the operational state. This embodiment advantageously allows the state directory to be immediately and reliably informed about the loss.

In some embodiments, the state directory may be located in a cloud, in a gateway between the server node and the client, or in a local network comprising the server node.

In one embodiment, the state directory may comprise an intermediate node in the network, the intermediate node located as to be able to monitor bootstrapping traffic from the server node. For example, the intermediate node could be the gateway between the server node and the client. In such an embodiment the state directory may be configured to detect that the server node has lost the operational state as a result of receiving from the server node a request for bootstrapping. This embodiment provides the advantage that the server node can remain completely unaware of the existence of a state directory. This means that no additional code is needed and that the mechanism can be used for any constrained server node already deployed. In addition, the operational state could be restored along with the bootstrapping information. In this manner, the restoration process can be made more efficient in terms of how quickly the process starts because there is no need to wait for bootstrapping to finish, and in terms of how much data is transferred, which may be important for energy usage.

In one further embodiment, the method may further include the state directory providing the operational state to the server node by replaying at least a portion of the part of the traffic between the server node and the client that led to the establishment of the operational state on the server node. In an embodiment, "replaying" could comprise replaying the messages generated by the client that led to the creation of the operational state on the server node, while suppressing the answers of the server node so that the answers are not again provided to the client. This embodiment provides the advantage that that the operational state is restored in a way that is completely transparent for the clients. There is no need to inform the clients about a server node rebooting and to implement additional client code to handle such server node rebooting in order to immediately reestablish the operational state.

In one embodiment, the server node may comprise a constrained device. The advantages of the disclosed embodiments are particularly evident for constrained devices, which are often not suitable candidates for storing the operational state in a manner where the stored state is not erased upon the device crashing.

In an embodiment, the server node may be communicably connected to the state directory over a low power and lossy network (LLN). In these situations, the state directory may advantageously handle issues that arise from the low power and lossy network gracefully by being an intermediary between the client and the server node(s), thereby shielding the client from issues associated with the LLN.

According to another aspect of an embodiment of the present invention, a state directory for enabling restoration of an operational state on a server node is provided. The state directory includes an interception unit for intercepting traffic between a client communicably connected to the server node over a network and the server node to derive the operational state, where at least a part of the traffic between the server node and the client leads to establishment of the operational state on the server node. The state directory further includes a memory for storing the operational state, a processor for detecting that the server node has lost the operational state, and a transmitter for providing the operational state to the server node after detecting that the server node has lost the operational state. Optionally, the state directory may further be configured to implement other method steps described herein.

According to another aspect of an embodiment of the present invention, a system comprising at least one server node and a state directory as described above is provided, the state directory being capable of intercepting traffic between the server node and a client, the client and the server node being communicably connected to one another.

The disclosure may also relate to a computer program product, implemented on computer-readable storage medium, preferably non-transitory, where the computer program product may comprise software code portions configured for, when run a computer, executing the method steps according to any of the methods described in the present disclosure. The computer program product is preferably implemented at least in part in any of: a server node, a state directory, an intermediary node, a storage, a transmitter, or a receiver.

The disclosure will further be illustrated with reference to the attached drawings, which schematically show embodiments according to the disclosure. It will be understood that the disclosure is not in any way restricted to these specific embodiments. Moreover, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which.

DETAILED DESCRIPTION

Figure 1:
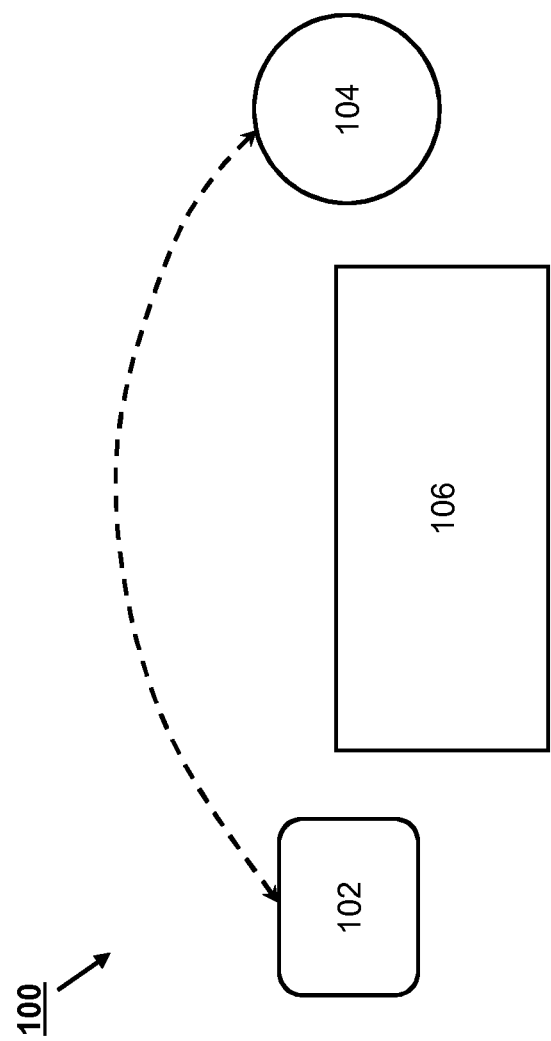
FIG. 1 shows an exemplary system comprising a client, a server node, and a state directory, according to one embodiment of the present disclosure.

FIG. 1 shows an exemplary network 100 comprising a client 102, a server node 104, and a state directory 106, according to one embodiment of the present disclosure.

The client 102 may include (user) applications configured to transmit requests to one or more nodes 104 acting as servers. Each server node 104 is associated with a node identifier (such as an address of the node in a network) and at least one resource. One or more of the clients 102 may request information regarding resource(s) on the server node 104, and/or to request the node to perform an action according to the capabilities of the node. The server node 104 may be a constrained node and may act as a server for more than one client 102. Although only one client and one server node are shown, the network 100 may include any number of server nodes and clients.

The client 102 is communicably connected to the server node 104 over a wired or wireless (or a combination of both) communication network, as shown in FIG. 1 with a dashed double arrow between these two entities. Generally, the client 102 is configured to access the server node 104 through a server-client relationship, using a protocol such as CoAP to access and/or manipulate resources located at the server node.

Figure 2:
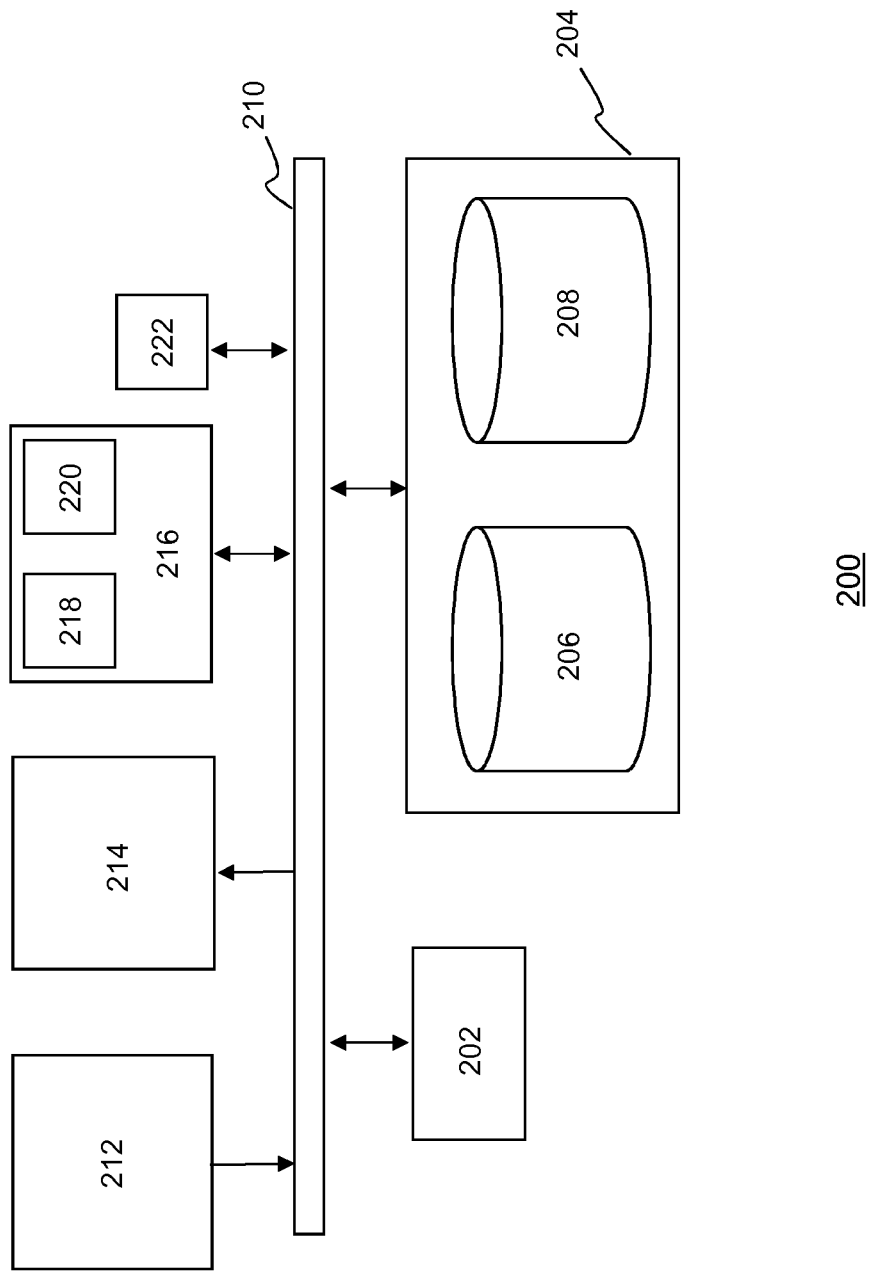
FIG. 2 shows a block diagram illustrating an exemplary data processing system that may be used as a state directory described with reference to FIG. 1, according to one embodiment of the present disclosure.

FIG. 2 is a block diagram illustrating an exemplary data processing system 200 that may be used as a state directory 106 as described with reference to FIG. 1.

Data processing system 200 may include at least one processor 202 coupled to memory elements 204 through a system bus 210. As such, the data processing system may store program code within memory elements 204. Further, processor 202 may execute the program code accessed from memory elements 204 via system bus 210. In one aspect, data processing system 200 may be implemented as a computer that is suitable for storing and/or executing program code. It should be appreciated, however, that system 200 may be implemented in the form of any system including a processor and memory that is capable of performing the functions described within this specification.

Memory elements 204 may include one or more physical memory devices such as, for example, local memory 206 and one or more bulk storage devices 208. Local memory may refer to random access memory or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from bulk storage device 208 during execution.

Input/output (I/O) devices depicted as input device 212 and output device 214 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 216 may also be coupled to data processing system to enable it to become coupled to other systems, computer systems, remote network devices, and/or remote storage devices through intervening private or public networks. The network adapter may, in particular, comprise a data receiver 218 for receiving data that is transmitted by said systems, devices and/or networks to said data and a data transmitter 220 for transmitting data to said systems, devices and/or networks. Modems, cable modems, and Ethernet cards are examples of different types of network adapter that may be used with data processing system 200.

The memory elements 204 may store an application (not shown). It should be appreciated that data processing system 200 may further execute an operating system (not shown) that can facilitate execution of the application. Application, being implemented in the form of executable program code, can be executed by data processing system 200, e.g., by processor 202. Responsive to executing application, data processing system may be configured to perform one or more operations to be described herein in further detail.

Further, the data processing system 200 implemented to function as the state directory 106 may further include an interception unit 222. The interception unit is responsible for intercepting all traffic to and from one or more server nodes 104 for which the state directory 106 is configured. In some cases interception can be accomplished by capturing all network communication that passes by the network adapter 202. In other cases, the interception unit might be required to configure intermediary or server nodes to forward (parts of the) network communication to the interception unit.

Person skilled in the art will recognize that while the elements 202-222 are shown in FIG. 2 as separate elements, in other embodiments their functionality could be implemented in lesser number of individual elements or distributed over a larger number of components.

Figure 3:
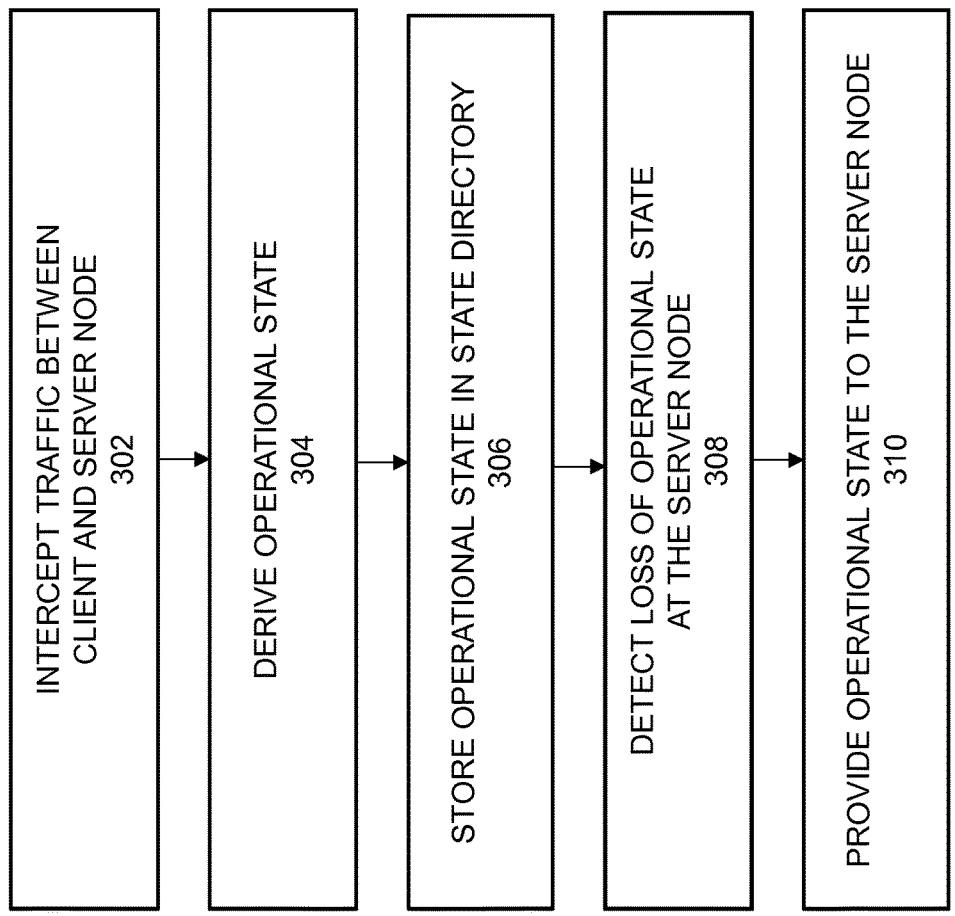
FIG. 3 provides a flow diagram of method steps for enabling restoration of an operational state on a server node, according to one embodiment of the present disclosure.

FIG. 3 provides a flow diagram of method steps for enabling restoration of an operational state on a server node, according to one embodiment of the present invention. While the method steps are described in conjunction with the elements shown in FIG. 1 and FIG. 2, persons skilled in the art will recognize that any system configured to perform the method steps, in any order, is within the scope of the present invention.

The method may begin in step 302, where the state directory 106, by means of e.g. the interception unit 222, intercepts traffic between the client 102 and the server node 104. At a minimum, the state directory 106, e.g. by means of the processor 202, is configured to be able to inspect the content of the packets exchanged between the client 102 and the server node 104. For this, the state directory 106 may either redirect the packets to a component (not shown in FIG. 1) that analyzes their content, thus breaking the normal flow of the packets between the client and the server node, or "sniff" the packets, i.e. obtain copies of the packets exchanged between the client and the server node while the original packets follow the normal flow. In order to support secure client-server connections, the state directory 106 needs to be able to transparently terminate the secured connection, as if the state directory was the server node, to be able to see the content of the traffic.

There are multiple possibilities as to how the functionality for intercepting the traffic between the client 102 and the server node 104 may be implemented, shown in FIG. 4 and described in greater detail below. In addition, FIG. 5, also described below, shows an exemplary messaging diagram illustrating interception of traffic.

At least part of the traffic between the server node and the client leads to establishment of the operational state on the server node. Therefore, in step 304, the processor 202 can use the intercepted traffic to derive the operational state on the server node 104. One strategy to derive the operational state from the intercepted traffic would be to process the traffic as if the state directory were the recipient of the traffic. In case of a CoAP observation relationship between the client 102 and the server node 104, the processor 202 determines that the GET request with the CoAP observe option creates the relationship and thus leads to the establishment of the operational state on the server node.

As previously described herein, the term "operational state" relates to all state information that defines the behavior of the server node 104 in an operational network, possibly over time. Some examples of operational state include routing tables, information about clients observing data resources on the server node 104 and defining which data will be sent by the server node (i.e., the behavior of the server node in the network), bindings between devices, group membership, and network, routing, and application protocol parameters. In case of a CoAP relationship between the client 102 and the server node 104, the related operational state may determine how and which data will be collected by the client and thus which traffic will appear in the network. In case of parameters, the operational state may determine the behavior of software and/or protocols running on the server node, which may also result in traffic in the network. Thus, the method step of intercepting the traffic between the client and the server node is not about the actual exchange of data (e.g. sensor measurements), but the exchange can lead to the generation and/or change of an operational state on the server node, such as e.g. a CoAP GET request with the observe option or a CoAP PUT to change a parameter.

The method may then proceed to step 306, where the operational state derived in step 304 is stored in the memory 204 of the state directory 106.

In step 308, the state directory 106 may detect, e.g. by means of the processor 202, that the server node 104 has lost the operational state derived in step 304. Various manners for such detection are described in greater detail below.

In step 310, after the detection of step 308, the state directory 106 may provide, e.g. by means of the transmitter 220, the lost operational state to the server node 104, thereby enabling restoration of the lost operational state on the server node. Various manners for doing so are described in greater detail below.

Figure 4:
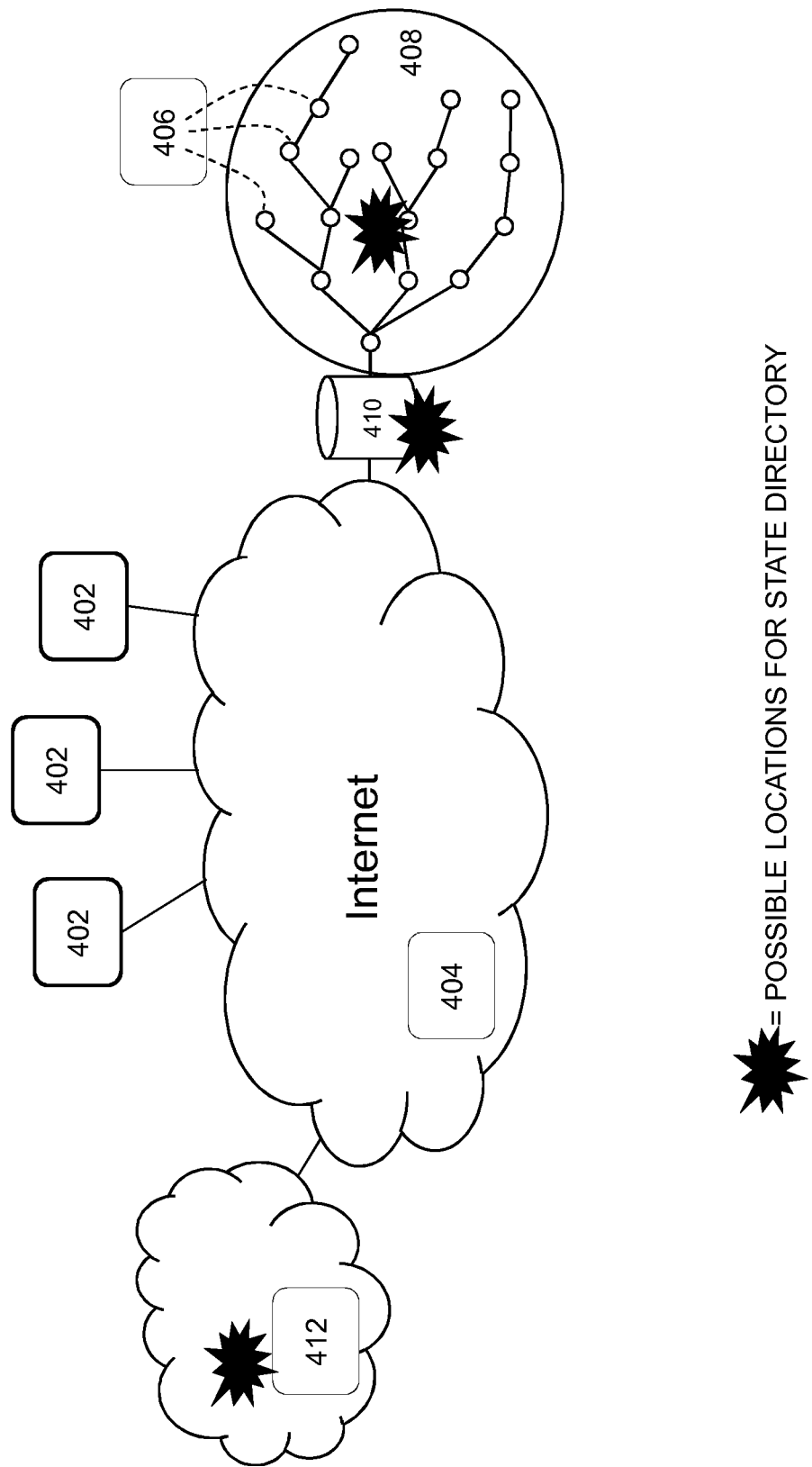
FIG. 4 illustrates possible locations of a state directory within an exemplary system comprising a plurality of clients and a plurality of server nodes, according to one embodiment of the present disclosure.

FIG. 4 illustrates possible locations of a state directory within an exemplary system comprising a plurality of clients and a plurality of server nodes, according to one embodiment of the disclosure. The illustrative system shows a typical scenario with a plurality of clients 402 (e.g., a client device, a user device, etc.), each of which could be the client 102 shown in FIG. 1, connected to a first communication network 404, such as e.g. Internet, and a plurality of server nodes 406 in a second communication network 408. Each of the server nodes 406 could be the server node 104 shown in FIG. 1. In some cases, the second communication network to which the server nodes are connected is a local network which is lossy and/or unreliable, e.g. LLN.

The system of FIG. 4 further shows a gateway node 410 located between the first communication network and the second communication network, as well as a cloud service 412 connected to the first communication network.

Generally speaking, the state directory acts as an intermediary (or an interface) between a client and a server node in that the state directory needs to at least be able to intercept traffic between the client and the server node that leads to the establishment of operational state on the server node. To that end, the functionality provided by the state directory is preferably implemented in such a location in the network where it would be possible to perform such interception. FIG. 4 illustrates three possible locations of the state directory, according to various embodiments of the present invention: one—on or associated with the gateway node 410, one—in the cloud 412, and one—within the second communication network 408, each of which will now be discussed. The state directory can be implemented in any one location or any combination of the above.

Preferably, the node in which the functionality of the state directory can be implemented is a node which has sufficient memory and/or power resources (i.e., preferably not a constrained node having small amount of memory and/or a limited battery life). A gateway node, such as the gateway 410, is typically a non-constrained node, and is suitable for handling the load associated with the functionality of the state directory. In particular, the gateway typically has sufficient capacity to store operational states and, thus, can be used as storage for a multitude of devices. Furthermore, the gateway node may provide a centralized location suitable for checking information for inconsistencies, e.g. inconsistencies within a domain. For instance, when server nodes have an at run-time configurable sleeping schedule that must be consistent between neighboring nodes (i.e. awake schedules of neighbors must always have some overlap), the state directory can serve as a source to check for inconsistencies in the sleeping schedule and correct the inconsistencies, if necessary.

Implementing the state directory in the gateway is particularly advantageous because all traffic from clients outside of the second communication network 408 to server nodes inside the network 408 passes the gateway, making the interception of this traffic easy to realize. In addition, since communication between the state directory and the server node would be confined to only the second communication network 408, communication delays would be comparable to those in the network 408 and realization of the functionality of a state directory would not necessitate special communications leaving the second communication network.

In various embodiments, the state directory located in the gateway may be discovered by the server node by being hard-coded or preconfigured, e.g. in ROM, of the server node, by the gateway node being configured to act as a state directory and local discovery (e.g., anycast in LLN), or by being configured during bootstrapping and commissioning of the server node.

In an embodiment, the functionality of the state directory may be implemented not on the gateway itself but distributed to some further node, as long as the gateway 410 is configured to cooperate with the state directory in that the gateway 410 would intercept traffic between the client and the server node and send a copy of the intercepted traffic to state directory. Similarly, with such cooperation, if gateway 410 detects a crash of the server node, it informs the state directory accordingly, thus enabling the state directory to detect that the server node has lost its operational state.

In another implementation, the functionality of the state directory could be realized in the cloud, provided that all traffic from the client destined for the server node in the second communication network 408, and vice versa, is routed via the cloud. In this manner, the state directory would act as a virtual gateway for the second communication network. Some advantages of such implementation include plenty of capacity to store operational state and ability to use information to check for inconsistencies, e.g. within a domain. However, such implementation would result in larger delays and in that some communication may leave the local network 408.

In various embodiments, the state directory located in the cloud may be discovered by the server node by being hard-coded or preconfigured, e.g. in ROM, of the server node, by being configured in and discovered via the gateway 410, or by being configured during bootstrapping and commissioning of the server node.

Finally, as also illustrated in FIG. 4, the state directory can be implemented within the second communication network 408. For example, if the server node is a constrained node using low-power Wi-Fi, the state directory can then be a node in the Wi-Fi network that overhears the traffic of the server node. In this case, interception of traffic to/from the client is possible if the state directory is implemented on the routing path of the traffic. Some advantages of such implementation include communications being confined to the second network 408, resulting in delays comparable to delays in LLN and communications not leaving the network 308, as well as dynamic discovery of the state directory. In addition, with such implementation any node within the second network 408 is able to offer state directory functionality, allowing e.g. a server node, in some cases, operated by a service provider, to advantageously offer state directory services to clients when the functionality of a state directory is implemented at that node.

In addition to the possibilities described above and illustrated in FIG. 4, in other implementations, the state directory can be implemented as a proxy that can reside anywhere. For example, clients that want that the operational state they will create is stored and restored, may use a proxy that offers this functionality. In such an implementation, the clients need to be explicitly aware of the proxy and specify the use of the proxy in their requests. In such a situation, (user) applications running on the client device may become more complex, but such a location for the state directory may be viable in a small network such as a home network. Advantageously, in this situation, the state directory functionality may be offered as a library that is readily usable by (user/client) applications. The library reduces the burden of implementing similar functionality at the application.

If the interaction with the plurality of server nodes requires short delays and/or orderly responses from the nodes, the state directory is preferably implemented at the location close to the nodes (e.g., requiring short distances between the state directory and the nodes). Generally speaking, the optimal location of the state directory depends on the use case (size and topology of the networks, the availability of a device that can handle the extra functionality as the state directory, etc.).

Figure 5:
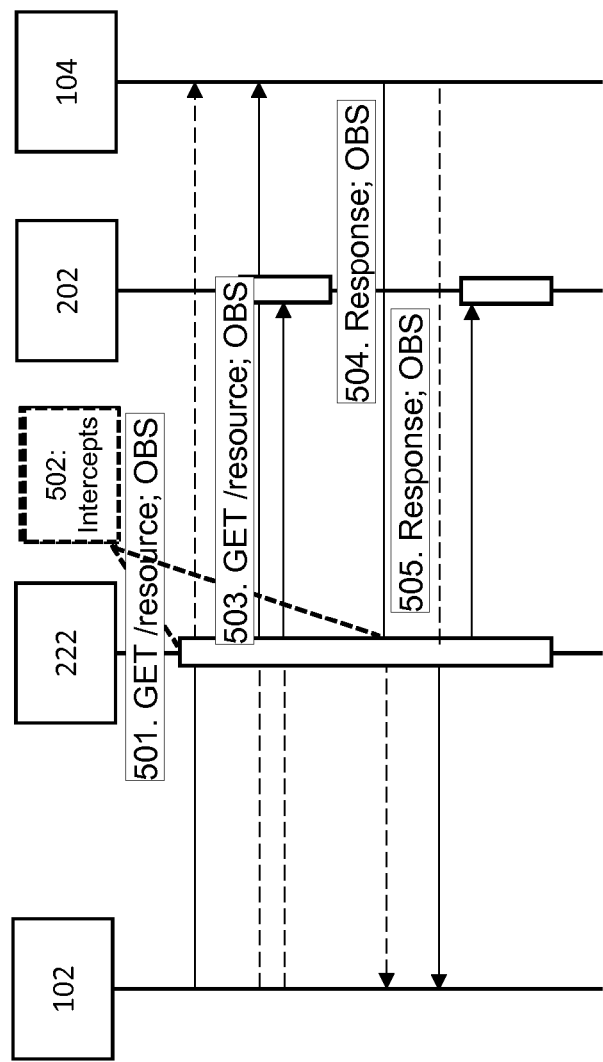
FIG. 5 shows an exemplary messaging diagram illustrating interception of traffic, according to one embodiment of the present disclosure.

FIG. 5 shows an exemplary messaging diagram illustrating interception of traffic, according to one embodiment of the present disclosure. The client 102 first sends a request to the server node 104 (step 501). An example of a request is shown in FIG. 5 as a GET/resource OBS request. As a person skilled in the art will recognize, in CoAP, "OBS" refers to a CoAP observe option (a CoAP option is very similar to a 1-line HTTP header option). A client adds this "OBS" option to its request to signal that it wants to observe the resource. By observing a resource, a client will receive all subsequent state changes of the resource. Thus, upon processing the request of step 501, the server node 104 will notify the client 102 of all subsequent state changes of the "/resource" resource by transferring the representation of the resource upon every state change to the client 102.

In step 502, the interception unit 222, located along the path between the client 102 and the server node 104, intercepts the request from client 102 to server node 104. In step 503, the interception unit 222 forwards the request to the server node 104 and also passes it on to the processor 202. In step 504, the server node 104 sends to the client 102 response to the request. In step 505, the interception unit 222 intercepts the response to forward the response to the client 102 and also pass it on to the processor 202.

Returning to step 308, described above, the various manners for the state directory 106 to detect the loss of the operational state on the server node 104 are now described.

Figure 6:
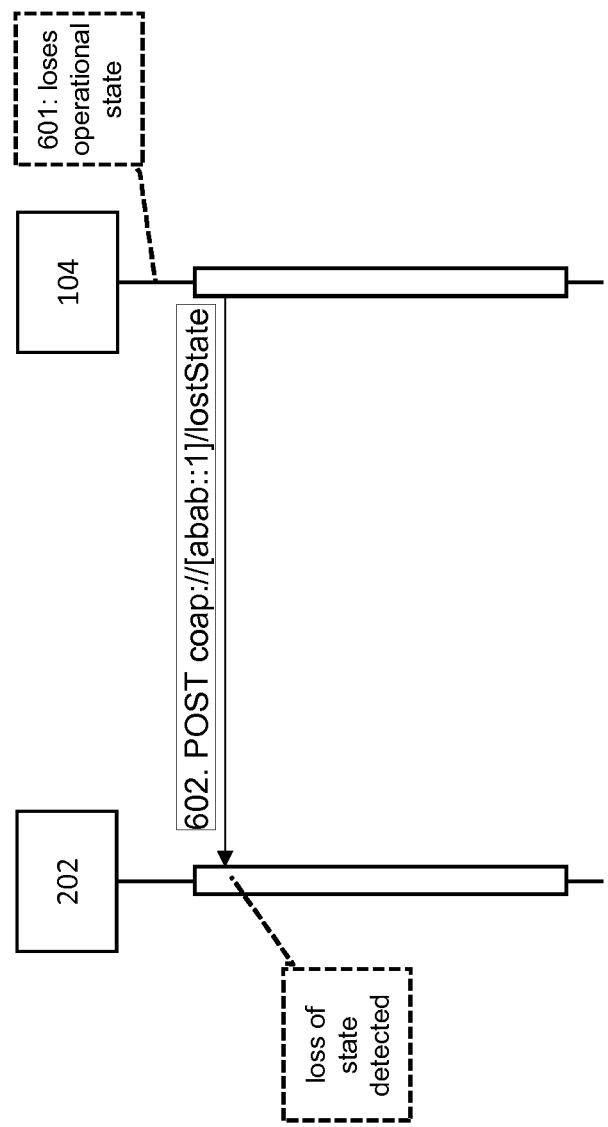
FIG. 6 shows an exemplary messaging diagram illustrating active detection of the loss of operational state, according to one embodiment of the present disclosure.

In one embodiment, the server node may be configured to actively indicate to the state directory that the operational state has been lost. For example, the server node may be configured that, once it crashes and reboots, then upon the reboot it discovers the state directory and contacts the state directory to indicate that it has crashed. Thus, in such an embodiment, the state director detects that the server node has lost the operational state as a result of receiving from the server node a message to that effect. An advantage of such implementation is that the state directory does not have to derive the occurrence of the loss from interceptions of e.g. bootstrapping traffic, e.g. for routing or address assignment. However, the server node does need to be aware about using a state directory. From an implementation point of view this can be realized using anycast because it allows the server node to provide the indication to the state directory without knowing the address of the state directory. FIG. 6 shows an exemplary messaging diagram illustrating this implementation, according to one embodiment of the present disclosure. In step 601, the server node 104 suspects that it has lost operational state, e.g. upon rebooting after a crash. Therefore, in step 602, the server node 104 contacts the state directory 106, e.g. the processor 202 within the state directory, to indicate, via an anycast address <abab::1>, that it has lost its operational state. Such a anycast address may have the same structure as an unicast address in IPv6. The indication of step 602 may comprise a CoAP POST request sent to the lostState resource on the state directory 106 to signal the loss of the operational state.

Figure 7:
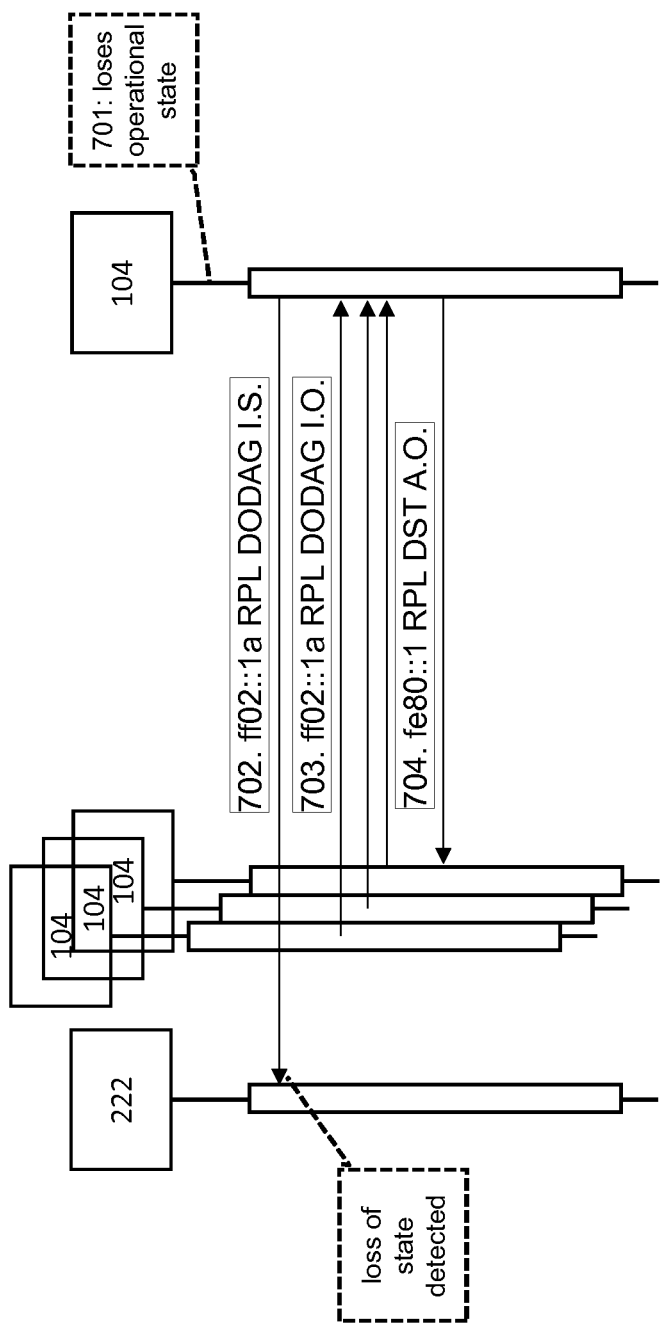
FIG. 7 shows an exemplary messaging diagram illustrating detection of the loss of operational state by intercepting bootstrapping traffic, according to one embodiment of the present disclosure.

In an embodiment where the state directory comprises an intermediate node located as to be able to monitor bootstrapping traffic from the server node, e.g. the state directory located in the gateway 410, the state directory may be configured to detect that the server node 104 has lost the operational state as a result of receiving from the server node a request for bootstrapping. Unlike the previous implementation, this embodiments allows that the server node can remain completely unaware of the existence of a state directory. This also means that no additional code is needed and that the mechanism can be used for any constrained server node already deployed. The operational state could then be restored along with the bootstrapping information, making the restoration process more efficient. FIG. 7 shows an exemplary messaging diagram illustrating this implementation, according to one embodiment of the present disclosure. In particular, the example shown in FIG. 7 is geared towards RPL—an open Internet standard for routing IPv6 communication inside low-power and lossy networks and its storing mode of operation. In the case of RPL the bootstrapping traffic consist of three messages. In step 701, the server node 104 loses the operational state. In step 702, the server node may inquire with its link-local neighbours for information about any RPL routing trees, i.e. a DODAG in RPL terminology, that it may join. In step 703, all neighbours that are aware of a DODAG, reply with an information object describing the DODAG, which typically contains the global IPv6 prefix to be used by the server node. In step 704, the server node notifies the parent it has chosen (out of all the candidates that replied in step 703) with its global IPv6 address. In turn, the parent can update its routing table with an entry for the server node 104.

In the embodiment illustrated in FIG. 7, the intercepting unit 220 has to able to physically overhear/'eavesdrop' the Information Soliciation message of step 702 in order for this approach to work. If this is not the case, e.g. when the state directory 106 comprises an intermediary node, then changes to the default storing mode operation of RPL would be required in order to signal Information Solicitation messages up the RPL tree towards the state directory in case it would be located only in the gateway or the cloud.

Returning to step 310, described above, the various manners for the state directory 106 to provide the lost operational state to the server node 104 are now described.

In the embodiment illustrated in FIG. 7, the interception unit 222 has to able to physically overhear/'eavesdrop' the Information Soliciation message of step 702 in order for this approach to work. If this is not the case, e.g. when the state directory 106 comprises an intermediary node, then changes to the default storing mode operation of RPL would be required in order to signal Information Solicitation messages up the RPL tree towards the state directory in case it would be located only in the gateway or the cloud.

In another embodiment, the state directory may provide the operational state to the server node by replaying at least a portion of the part of the traffic between the server node and the client that led to the establishment of the operational state on the server node in the first place. Such replaying of traffic preferably comprises replaying the messages generated by the client that led to the creation of the operational state on the server node, while suppressing the answers of the server node. Such mechanism could, advantageously, be transparent, but at the same time also quick as the state restoration could take place e.g. immediately after detection of server node rebooting. In the absence of such a mechanism, the restoration of the state would completely depend on client-side mechanisms to detect loss of operational state. As client nodes do not want to burden the constrained server nodes with additional traffic to verify the existence of this state, these mechanisms are usually slow (e.g. every few hours, daily, etc). Consequently, important information may be missed by clients.

Figure 8:
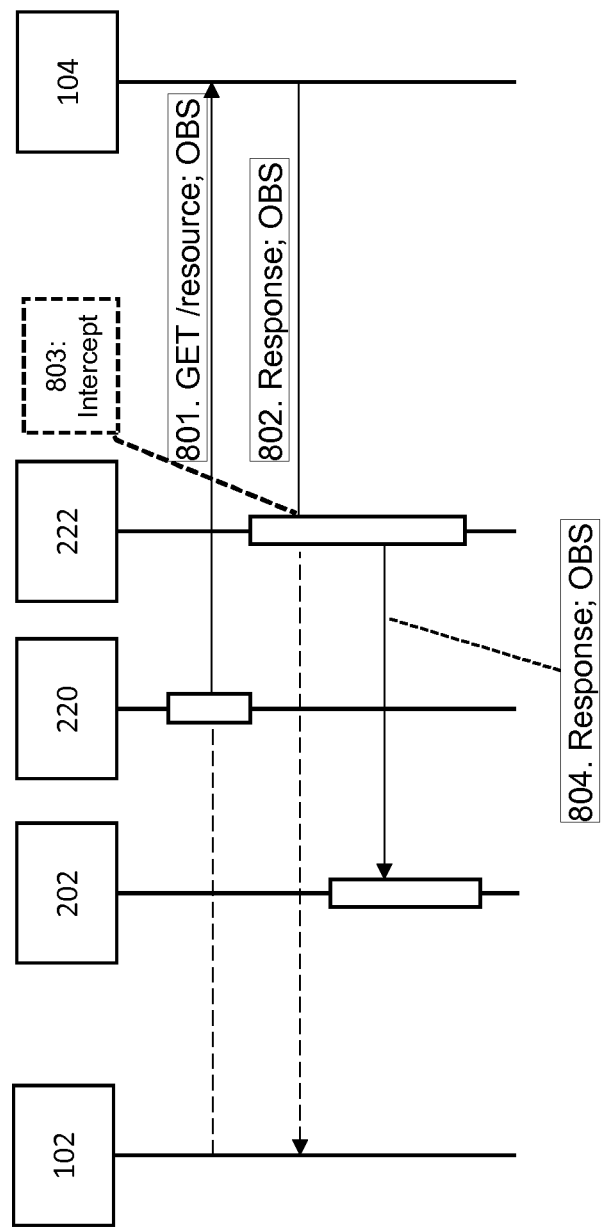
FIG. 8 shows an exemplary messaging diagram illustrating the state directory providing the lost operational state to the server node, according to one embodiment of the present disclosure.

FIG. 8 shows an exemplary messaging diagram illustrating restoration of operational state by replaying traffic, according to one embodiment of the present disclosure. After the processor 202 has determined and has signalled to the transmitter 220 that the server node 104 lost its operational state, the transmitter can enable restoration of the state on the server node by replaying intercepted requests from one or more clients. In step 801, for the case that there is one client 102 that previously issued an observe request for a resource on the server node 104, the transmitter 220 will send this request, pretending it is the client 102, to the server node 104. In step 802, the server node 104 processes the replayed request, which will lead to the operational state being created on the server node. After processing the request, the server node 104 may respond to the client 102 indicating that the request was successfully executed and that the state has been created. In this case, the operational state that is restored is the observation relationship between the client 102 and the server node 104. In step 803, however, the interception unit 222 intercepts the response. In order to ensure transparency for the client 102, the intercepted response will typically not be forwarded to the client 102 by the interception unit 222. In step 804, the interception unit passes the intercepted response to the processor 202, so that it can verify that the state has been restored on the server node 104 or take action otherwise.

In addition to the steps described above, the method of FIG. 3 may further comprise steps for removing the operational state from the state directory. Just as the server node removes operational states which are no longer needed, e.g. because the client-server relationship is no longer active or because the client indicated it wishes to remove the state (e.g. terminate the relationship), the state directory needs to remove such operational states as well. Without such removal, inconsistencies between the operational state on the server node and the operational state stored in the state directory may arrive. Upon the server node losing its operational state the state directory would then provide too much operational state to the server node. This could, in turn, lead to unnecessary traffic on the network because the server node would then assume the existence of more relationships than there are in reality and act accordingly. For example, the server node could then end up sending responses to a client that is already long gone.

Three embodiments for removing the operational state from the state directory are now described.

Figure 9:
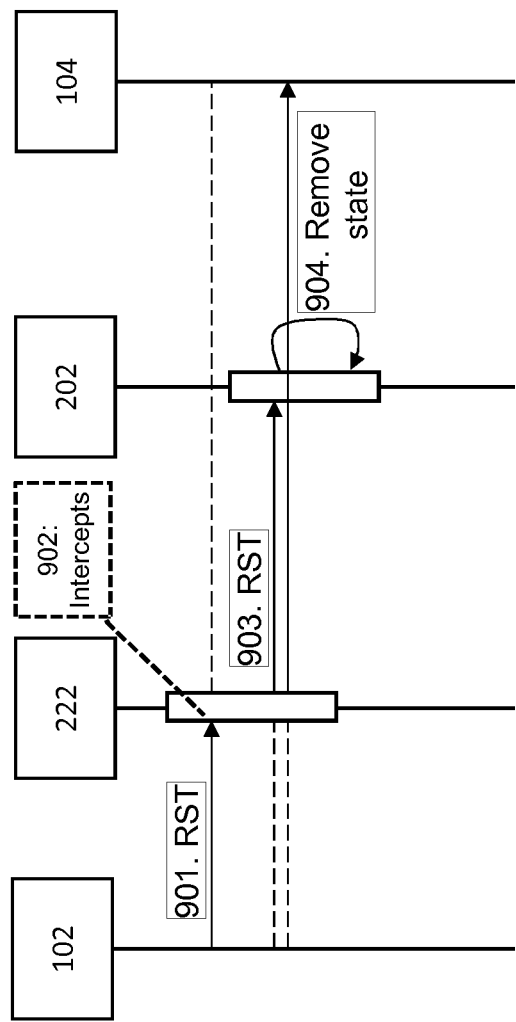
FIG. 9 shows an exemplary messaging diagram illustrating removal of the operational state from the state directory, according to one embodiment of the present disclosure.

According to one embodiment, the method shown in FIG. 3 may further comprise the state directory intercepting further traffic between the server node 104 and the client 102 to determine that the operational state is to be removed from the state directory and, after such a determination, removing the operational state from the state directory. FIG. 9 shows an exemplary messaging diagram illustrating removing of the operational state according to this embodiment. In step 901, the client 102 sends message to remove state, in this case to cancel the observation relationship that was established earlier via a so-called Reset message. In step 902, the interception unit 222 intercepts the RST message. In step 903, the interception unit 222 sends the intercepted RST message to the server node 104 and to the processor 202. The former will allow the server node to remove the operational state, while the latter allows the state directory to do the same. In step 904, the processor 202 removes the previously gathered operational state from the memory 204. In this case, the processor 202 will remove the observation relationship that existed between the client and the server.

According to another embodiment, it could be that, instead of the presence of further traffic between the client and the server node, it is the lack of such traffic that indicates to the state directory that the operational state should be removed. Thus, the state directory could be configured to establish that the operational state is to be removed from the memory of the state directory as a result of the lack of further traffic between the server node and the client and, consequently, remove the operational state from the memory 104. This embodiment may be particularly advantageous in scenarios where additional signaling may be needed from the client, the server node, or both to keep the relationship alive or to verify its existence. For example, a client may establish a relationship with a server node where, upon establishment of the relationship, it is agreed that the client needs to refresh its interest in the relationship once per certain amount of time, e.g. once an hour. With such an agreement, if the state directory does not intercept a new message in which the client expresses its interest, the state directory will determine that the server node will remove the operational state and that, therefore, the operational state should be removed from the state directory as well.

In the third embodiment, the state directory may be communicably connected to a further node over either the network 404 or the network 408, and the method may then further comprise the state directory receiving from the further node a request to remove the operational state from the state directory, and removing the operational state from the state directory after receiving such request. In this manner, a party other than the client 102, the server node 104, and the state directory, is able to remove the operational state from the state directory and, possibly, even to specify which operational state should be collected and stored by the state directory. This third party would typically be the administrator of the network, which network could be, depending on the use case, either network 404 or network 408, or both, that uses some form of management platform to configure the network.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 202 described herein.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for enabling restoration of an operational state on a server node, the method comprising:
intercepting, by a state directory, traffic between a client communicably connected to the server node over a network and the server node to derive the operational state, where at least a part of the traffic between the server node and the client leads to establishment of the operational state on the server node;
storing the operational state in the state directory;
detecting, by the state directory, that the server node has lost the operational state;
providing, by the state directory, the operational state to the server node after detecting that the server node has lost the operational state;
intercepting, by the state directory, further traffic between the server node and the client to determine that the operational state is to be removed from the state directory; and
removing the operational state from the state directory after said determination.

2. The method according to claim 1, wherein the state directory is located in a cloud, in a gateway between the server node and the client, or in a local network comprising the server node.

3. A method for enabling restoration of an operational state on a server node, the method comprising:
intercepting, by a state directory, traffic between a client communicably connected to the server node over a network and the server node to derive the operational state, where at least a part of the traffic between the server node and the client leads to establishment of the operational state on the server node;
storing the operational state in the state directory;
detecting, by the state directory, that the server node has lost the operational state;
providing, by the state directory, the operational state to the server node after detecting that the server node has lost the operational state;
determining, by the state directory, that the operational state is to be removed from the state directory as a result of the lack of further traffic between the server node and the client; and
removing the operational state from the state directory after said determination.

4. The method according to claim 3, wherein the state directory is located in a cloud, in a gateway between the server node and the client, or in a local network comprising the server node.

5. A method for enabling restoration of an operational state on a server node, the method comprising:
intercepting, by a state directory, traffic between a client communicably connected to the server node over a network and the server node to derive the operational state, where at least a part of the traffic between the server node and the client leads to establishment of the operational state on the server node;
storing the operational state in the state directory;
detecting, by the state directory, that the server node has lost the operational state;
providing, by the state directory, the operational state to the server node after detecting that the server node has lost the operational state;
wherein the state directory comprises an intermediate node in the network located as to be able to monitor bootstrapping traffic from the server node and wherein the state directory detects that the server node has lost the operational state as a result of receiving, from the server node, a request for bootstrapping.

6. The method according to claim 5, wherein the state directory provides the operational state to the server node by replaying at least a portion of the part of the traffic between the server node and the client that led to the establishment of the operational state on the server node.

7. The method according to claim 5, wherein the state directory is located in a cloud, in a gateway between the server node and the client, or in a local network comprising the server node.

8. A state directory for enabling restoration of an operational state on a server node, the state directory comprising:
an interception unit for intercepting traffic between the server node and a client communicably connected to the server node over a network to derive the operational state, where at least a part of the traffic between the server node and the client leads to establishment of the operational state on the server node;
a memory for storing the operational state;
a processor for detecting that the server node has lost the operational state; and a transmitter for providing the operational state to the server node after detecting that the server node has lost the operational state;
the interception unit further configured for intercepting further traffic between the server node and the client to determine that the operational state is to be removed from the state directory; and
the processor further configured to remove the operational state from the state directory after said determination.

9. A computer-readable non-transitory storage medium having computer program code stored thereon configured for, when run on a computer, executing the method steps according to claim 1.

10. A state directory for enabling restoration of an operational state on a server node, the state directory comprising:
an interception unit for intercepting traffic between the server node and a client communicably connected to the server node over a network to derive the operational state, where at least a part of the traffic between the server node and the client leads to establishment of the operational state on the server node;
a memory for storing the operational state;
a processor for detecting that the server node has lost the operational state; and a transmitter for providing the operational state to the server node after detecting that the server node has lost the operational state;
the processor further configured to determine that the operational state is to be removed from the state directory as a result of the lack of further traffic between the server node and the client and to remove the operational state from the state directory after said determination.

11. A state directory for enabling restoration of an operational state on a server node, the state directory comprising:

an interception unit for intercepting traffic between the server node and a client communicably connected to the server node over a network to derive the operational state, where at least a part of the traffic between the server node and the client leads to establishment of the operational state on the server node;

a memory for storing the operational state;

a processor for detecting that the server node has lost the operational state; and a transmitter for providing the operational state to the server node after detecting that the server node has lost the operational state;

wherein the state directory comprises an intermediate node in the network located as to be able to monitor bootstrapping traffic from the server node and wherein the state directory detects that the server node has lost the operational state as a result of receiving, from the server node, a request for bootstrapping.

12. The state directory according to claim 11, wherein the state directory provides the operational state to the server node by replaying at least a portion of the part of the traffic between the server node and the client that led to the establishment of the operational state on the server node.

13. A computer-readable non-transitory storage medium having computer program code stored thereon configured for, when run on a computer, executing the method steps according to claim 3.

14. A computer-readable non-transitory storage medium having computer program code stored thereon configured for, when run on a computer, executing the method steps according to claim 5.

* * * * *